United States Patent
Li et al.

(10) Patent No.: US 9,288,285 B2
(45) Date of Patent: Mar. 15, 2016

(54) RECOMMENDING CONTENT IN A CLIENT-SERVER ENVIRONMENT

(71) Applicants: Wen-Syan Li, Freemont, CA (US); Heng Wang, Shanghai (CN); Gufei Sun, Shanghai (CN)

(72) Inventors: Wen-Syan Li, Freemont, CA (US); Heng Wang, Shanghai (CN); Gufei Sun, Shanghai (CN)

(73) Assignee: SAP SE, Walldorf (DE)

( * ) Notice: Subject to any disclaimer, the term of this patent is extended or adjusted under 35 U.S.C. 154(b) by 276 days.

(21) Appl. No.: 14/055,565

(22) Filed: Oct. 16, 2013

(65) Prior Publication Data
US 2015/0095407 A1 Apr. 2, 2015

(30) Foreign Application Priority Data

Sep. 26, 2013 (CN) .......................... 2013 1 0459579

(51) Int. Cl.
| | |
|---|---|
| *G06F 15/16* | (2006.01) |
| *H04L 29/06* | (2006.01) |
| *H04L 29/08* | (2006.01) |
| *G06F 17/30* | (2006.01) |
| *G06Q 20/00* | (2012.01) |
| *G06F 7/00* | (2006.01) |

(52) U.S. Cl.
CPC .......... *H04L 67/42* (2013.01); *G06F 17/30861* (2013.01); *H04L 63/0428* (2013.01); *H04L 67/306* (2013.01)

(58) Field of Classification Search
CPC . H04L 63/042; H04L 63/04287; H04L 67/42; H04L 67/306; G06F 17/30861
See application file for complete search history.

(56) References Cited

U.S. PATENT DOCUMENTS

| | | | | |
|---|---|---|---|---|
| 7,269,578 | B2* | 9/2007 | Sweeney | G06F 17/30424 705/64 |
| 8,219,546 | B2 | 7/2012 | Yan et al. | |
| 8,332,390 | B2 | 12/2012 | Yan et al. | |
| 8,868,680 | B2* | 10/2014 | Gupta | H04N 21/25808 709/203 |
| 2010/0312762 | A1 | 12/2010 | Yan et al. | |
| 2010/0318495 | A1 | 12/2010 | Yan et al. | |
| 2010/0318559 | A1 | 12/2010 | Yan et al. | |
| 2010/0325281 | A1 | 12/2010 | Li et al. | |
| 2011/0029566 | A1* | 2/2011 | Grandison | G06Q 50/01 707/783 |
| 2011/0093852 | A1 | 4/2011 | Li et al. | |
| 2011/0314233 | A1 | 12/2011 | Yan et al. | |
| 2012/0084151 | A1* | 4/2012 | Kozak | G06Q 30/02 705/14.58 |
| 2012/0173502 | A1* | 7/2012 | Kumar | G06F 17/30038 707/706 |
| 2013/0006988 | A1 | 1/2013 | Li et al. | |
| 2013/0066455 | A1 | 3/2013 | Li et al. | |
| 2013/0066774 | A1 | 3/2013 | Li et al. | |
| 2013/0117752 | A1 | 5/2013 | Li et al. | |
| 2013/0262471 | A1* | 10/2013 | Whitman | G06F 17/3002 707/742 |

* cited by examiner

*Primary Examiner* — Wen-Tai Lin
(74) *Attorney, Agent, or Firm* — Fish & Richardson P.C.

(57) ABSTRACT

Techniques for recommending content to a user include identifying classified public content stored on a server appliance or a repository; identifying private content of a user stored on a client appliance or a repository, the client appliance communicably coupled to the server appliance through a network; receiving, from the user, a request for a recommendation of content; generating a representative query based on the request for the recommendation of content; determining, based on the representative query, a portion of the classified public content stored on a server appliance or the repository; determining, based on the request, a portion of the private content stored on the client appliance or the repository; and preparing, for presentation to the user, the portion of the classified public content based on the representative query and the portion of the private content based on the request for the recommendation of content.

18 Claims, 5 Drawing Sheets

RECOMMENDING CONTENT IN A CLIENT-SERVER ENVIRONMENT

CLAIM OF PRIORITY

This application claims priority under 35 USC §119(e) to China Application Serial No. 201310459579.3 filed on Sep. 26, 2013, the entire contents of which are hereby incorporated by reference.

TECHNICAL BACKGROUND

This disclosure relates to recommending content to a user, and more particularly, to recommending content to a user in a client-server environment while addressing privacy concerns for the user.

BACKGROUND

Many applications, including web based applications, assist users with finding relevant information. For example, a user searching for an item, such as a glass coffee table, on a shopping website can be presented a best match for the received query and/or a plurality of additional results, such as a glass shelve matching the glass coffee table, that might interest the user. Organizations can make information accessible to users by using content recommender systems in a number of servers, such as file servers and web servers. Unstructured data stored in traditional file servers, web servers and other content servers constitute the largest percentage of data in many enterprises. Traditional content recommender systems require the collection and storage of uniquely identifiable data relating to a user, including personal queries, browsing history, behavior characteristics, profile data and private communication messages.

Drawbacks of traditional content recommender systems are the requirement for personal data and identification of personal preferences and computationally intensive training processes that use large quantities of data (labeled or non-labeled) to train a classification model. Some traditional content recommender systems can be configured to collect and store any personal data that can help the system improve its recommendation accuracy. In some cases the collected data is stored in a public database, preventing the user from fully controlling data privacy. Existing private information retrieval methods usually require a distributed database, and even though, they can only provide privacy reservation for a single server node. Overall, the use of personalized data as input for content recommender systems raises privacy concerns. The conflict between growing privacy concerns and increased demands for accurate content recommender systems has become a serious issue.

SUMMARY

The present disclosure relates to computer-implemented methods, software, and systems for recommending content to a user by, for instance, separating private and public content to address user privacy concerns. In one general embodiment, a computer-implemented method of recommending content to a user includes identifying classified public content stored on a server appliance or a repository that is communicably coupled to the server appliance; identifying private content of a user stored on a client appliance or a repository that is communicably coupled to the client appliance, the client appliance communicably coupled to the server appliance through a network; receiving, from the user, a request for a recommendation of content; generating a representative query based on the request for the recommendation of content; determining, based on the representative query, a portion of the classified public content stored on a server appliance or the repository that is communicably coupled to the server appliance; determining, based on the request, a portion of the private content stored on the client appliance or the repository that is communicably coupled to the client appliance; and preparing, for presentation to the user, the portion of the classified public content based on the representative query and the portion of the private content based on the request for the recommendation of content.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general embodiments further includes receiving, at the client appliance, an index that includes a list of the portion of the classified public content; filtering the portion of the classified public content based on one or more user settings; and preparing the list of the filtered portion of the classified public content for presentation to the user.

A second aspect combinable with any of the previous aspects further includes presenting, to the user, the list of the filtered portion of the classified public content, the list including one or more hyperlinks associated with the classified public content; and presenting, to the user, the portion of the private content based on the request for the recommendation of content.

A third aspect combinable with any of the previous aspects further includes parsing the request for the recommendation of content for one or more keywords; identifying one or more user privacy settings; determining one or more proxy keywords associated with the one or more keywords based on the one or more user privacy settings; and generating the representative query based on the one or more proxy keywords.

In a fourth aspect combinable with any of the previous aspects, at least one of the client appliance, the server appliance, or the network includes a firewall that restricts unauthorized access between the client appliance and the server appliance.

A fifth aspect combinable with any of the previous aspects further includes identifying public content communicably exposed to the server appliance, the public content including a plurality of electronic documents; generating a plurality of model parameters based on a topic model process performed on the plurality of electronic documents; and classifying the public content based on the model parameters to generate the classified public content.

In a sixth aspect combinable with any of the previous aspects, the public content includes data publicly available through a world wide web, and the private content includes at least one of an electronic mail associated with the user, a text or SMS message associated with the user, or a social networking message associated with the user.

Various implementations of a computing system according to the present disclosure may provide one or more of the following features. For example, the content recommender system can provide privacy conscious content recommendation. For example, the content recommender system can include a classification algorithm with transferable and generally applicable model parameters to classify both private and public documents. Instead of using a replicated database, the content recommended system may be based on a fuzzy query mechanism and local filtering to provide user controllable privacy-performance balance settings. By maintaining the private information at the client system and by providing users with highly flexible abilities of privacy control, the risk of user data leakage is reduced. Additionally, the client's computation requirement is kept relatively low in the dataflow.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

In general, some embodiments of the present disclosure are directed to recommending content to a user. In particular, embodiments of the present disclosure are directed to recommending content to a user from a plurality of documents including text, while addressing privacy concerns for the user. For example, the content recommender system can receive a request from a user containing keywords corresponding to a particular search or request for content. Publicly available content, which may be topically classified in some aspects, may be searched according to the keywords or keyword proxies (e.g., through a fuzzy search). Private content (e.g., from a particular user) may be searched according to the keywords (e.g., metadata, topical keywords, or otherwise). Such public and private content may be presented to the user for viewing (e.g., through one or more links to such content).

For example, the content recommender system can maintain user's privacy by converting the original request into a respective query according to a predefined filter. In some embodiments, the predefined filter can be a hierarchical index of query conditions. Metadata related query conditions can be generally hierarchically structured, including a limited set of possible values. For example, authors can be easily categorized by their metadata, such as age, nation, style, etc. Content related query conditions (e.g., topic keywords) are generally not well structured and might require an additional processing algorithm to determine the hierarchical index.

The respective query can be send to a public site to enable the content recommender system to respond to the request by using both public and private information. Public documents, such as news, can be stored on a server appliance or a repository that is communicably coupled to the server appliance. Private documents, such as e-mails, can be stored on the client appliance or on a repository that is communicably coupled to the client appliance. The content recommender system can use the request to determine a portion of the private documents that can be relevant to the user. The content recommender system can also use the respective query to determine a portion of the public documents that can be relevant to the user. The determined portions of private and public documents can be included in an output generated by the content recommender system. For example, the determined portions of private and public documents can be displayed within a graphical user interface (GUI).

Figure 1:
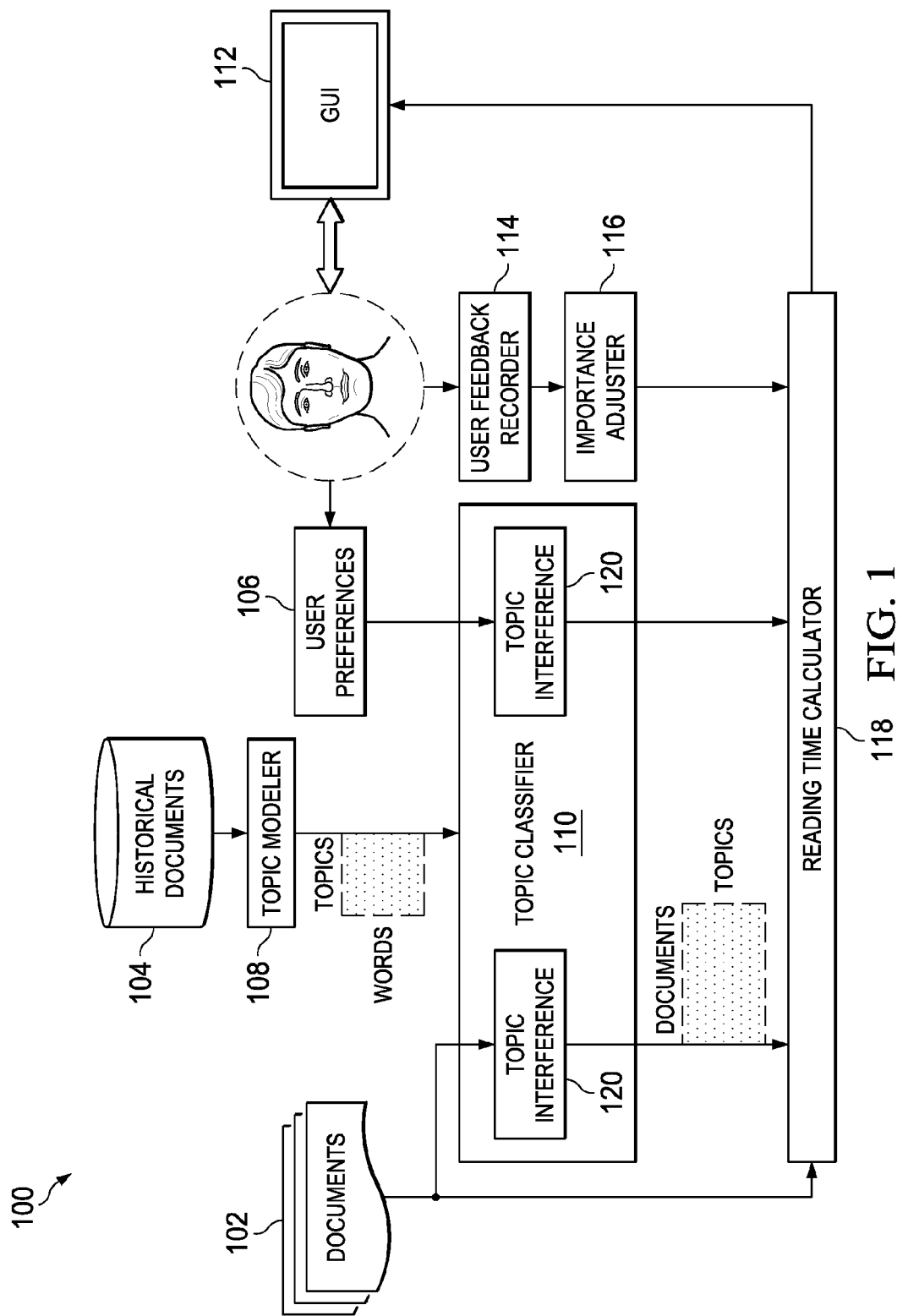
FIG. 1 is a block diagram of an example computing architecture for recommending content to a user.

FIG. 1 is a block diagram of an example computing architecture 100 for recommending content to a user with increased privacy control. The computing architecture 100 can include a server system 102 and a client system 104. In some embodiments, the server system 102 can be a search engine provider. The server system 102 can use as input public documents 106 and can use multiple public processing components. The public processing components at the server system 102 can include a tokenizer and tagger 108, a structured document 110, a topic modeler 112, model parameters 114, and a server topic classifier 116, as shown in this figure. The private site 104 can use as input private documents 118 and can use multiple private processing components to generate recommended documents 120. The private processing components at the private site 104 can include a client topic classifier 122, user preferences 124, and a filtering component 126.

The computing architecture 100 can start by retrieving and classifying the public documents 106. The public documents 106 can be retrieved from documents, having different types of formats, each document including at least a portion of text. The public documents 106 can be classified based on a variety of topics, including society, economics, entertainment, sports, technology, science and others.

In some embodiments, a document retrieved from the public documents 106 can be processed by the tokenizer and tagger 108. The tokenizer and tagger 108 can parse the text of a document to extract all words and/or phrases, except for the conjunctions, the determiners and the pronouns. The words and/or phrases extracted by the tokenizer and tagger 108 can be defined as tokens. The tokenizer and tagger 108 can also generate a tag for each identified token. For example, the tokenizer and tagger 108 can count the occurrences of a token within a document to determine the frequency of each token. The tokenizer and tagger 108 can also determine particular characteristics for each identified token (e.g., length and objective). The determined frequency and characteristics can be included in the tag associated to each token. The tokenizer and tagger 108 can generate a structured document 110, including tokens (e.g., words and/or phrases) with their tags.

In some embodiments, the structured document 110 can be provided to the topic modeler 112. The topic modeler 112 can process the structured document 110 to generate model parameters 114, by using a training process 128. The structured document 110 can be represented by the vector of tokens' frequency. The set of all structured documents 110 received can be represented by a words-documents matrix 130. The size of the words-documents matrix 130 can be $N_{words} \times N_{docs}$. The number of tokens can be relatively small (e.g., hundreds of thousands). The number of structured documents 110 can be very large. For example, over a million structured documents 110 can be obtained from public documents 106, which are automatically extracted by the computing architecture 100 from the World Wide Web. The topic modeler 112, in some aspects, uses only public documents as a training set, therefore protecting user's privacy.

During the training process 128, each words-documents matrix 130 can be decomposed in two matrices: the words topics matrix 132 and the documents-topics matrix 134. The topics in the words-topics matrix 132 and the documents-topics matrix 134 can be abstract topics or predefined topics. The words topics matrix 132 can be based on a probabilistic distribution of words on different topics. For example, words topics matrix 132 includes a probability of each word to exist in a document, such that higher the probability associated to a word for a particular topic, higher the chance of the word to correspond to a particular topic. The probabilistic distribution can be applied to any type of words and topics. The size of the words topics matrix 132 can be smaller than the size of the words-documents matrix 130 because the number of topics can be smaller than the number of documents. The words topics matrix 132 can be saved and used by the topic modeler 112 as model parameters 114.

In some embodiments, the documents-topics matrix 134 can be an index of probability that each of the processed documents corresponds to a particular topic. The documents-topics matrix 134 can be determined for a given set of structured documents 110 and token distribution on topics using a Latent Dirichlet Allocation (LDA) model. The documents-topics matrix 134 can be determined both during the training process and during the recommendation of content process. For example, during the recommendation of content process, the topic modeler 112 can generate the index using the LDA model and the model parameters 114, for both public documents 106 and private documents 118.

The model parameters 114 can be provided to each of server topic classifier 116 and client topic classifier 122. For example, the server topic classifier 116 can use the model parameters 114 and the fuzzy query received from the filtering component 126 to order and classify public topics matching a request of recommendation of public documents. The output generated by the server topic classifier 116 can be provided to the filtering component 126.

In some embodiments, the client topic classifier 122 can use the model parameters 114 to process the private documents 118 and extract the corresponding topics. Examples of private documents 118 can include, but is not limited to personal messages, subscriptions, contacts, address and browsing history. The filtering component 126, can receive as input the private topics generated by the client topic classifier 122 and the user preferences 124.

User preferences 124 can include, but are not limited to favorite topics, VIP contacts and content type priority. User preferences 124 can be used on the client system 104 by the filtering component 126 and cannot be directly transferred to the server. The filtering component 126 can apply user preferences 124 to filter and order private topics generated by the client topic classifier 122 or public topics generated by the server topic classifier 116. The filtering component 126 can also filter a request from a user. For example, users' preferences 124 can be translated by the filtering component 126 into a set of fuzzy queries, such as topics, keywords, time conditions, authors and so on. For a recommendation including public documents, the filtering component 126 can provide the fuzzy queries to the server topic classifier 116.

The transmission of the fuzzy queries to the server topic classifier 116 can enable the server to control the processing speed, while maintaining user's privacy. The filtering component 126 can use any applicable filtering method, including, but not limited to, item based collaborative filtering or content based filtering. The filtering component 126 can use the filtering results to generate the recommended documents 120. The recommended documents 120 can include the documents or links to documents matching the request of the user. In some examples, the recommended documents 120 include both public documents and private documents. In other examples, the recommended documents 120 distinctly separate the public documents from the private documents. In some embodiments, the data flow through the computing architecture 100 can depend on the data sources, as described with reference to FIGS. 2A and 2B.

Figure 2:
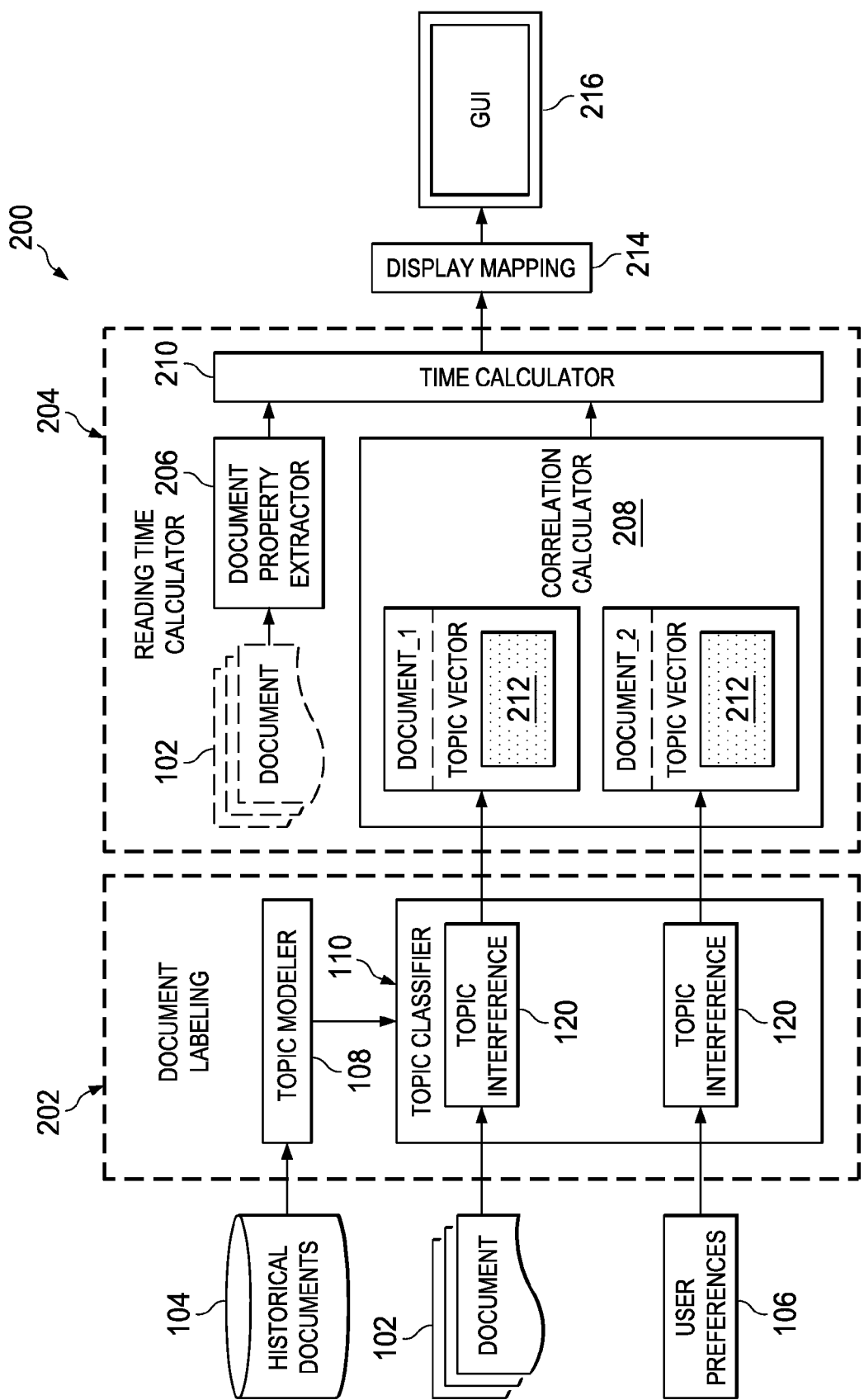
FIG. 2 is a block diagram that illustrates example data flows for a recommendation of public content.

FIG. 2 is a block diagram that illustrates an example data flow 200 for a recommendation of public content. The data flow 200 includes user preferences 202, a filtering component 204, fuzzy queries 206, a server 208, an index of recommended documents 210, links to documents 212, an original data source 214, and recommended documents 216.

Data flow 200 can start with a user query, defining user preferences 202. User preferences 202 can be provided to the filtering component 204, which generates a fuzzy query 206. The filtering component 204 on the client can generate fuzzy queries 206 according to users' privacy settings. The fuzzy queries 206 can blur the particular interest of a user and ask for a larger result set including private documents. For example, if the user's preference indicates request of information about "Kobe Bryant", the filtering component 204 can generate a fuzzy query 206 asking for information about "NBA" or even, more general, about "Sports". Fuzzy queries 206 with a higher level of privacy can generate a larger number of recommended documents, which requires more communication overhead. In some embodiments, the filtering component 204 uses a hierarchical structure of topics to enable the fuzzy process. Users can select a level on the hierarchical structure of topics corresponding to a particular privacy setting. The filtering component 204 can generate a safer fuzzy query 206 corresponding to a strict setting on the hierarchical structure of topics, which returns a broader recommendation, as described with reference to FIG. 3. Additionally, the variation in safety level also affects the processing time, fuzzier queries 206 being associated with higher cost.

The fuzzy query 206 can be provided to the server 208. For example, and as described with reference to FIG. 1, the component of the server 208 configured to process a fuzzy query 206 can be a server topic classifier (e.g., server topic classifier 116 in FIG. 1). The server 208 can return an index of recommended documents 210 to the filtering component 204. The index of recommended documents 210 can be a document-topic matrix. For a set of public documents and words distribution on topics, a document-topic matrix can be estimated according to LDA model or directly from previously determined model parameters, as described with reference to FIG. 1.

The filtering component 204 can process the index of recommended documents 210 to generate links to documents 212. In some embodiments, the links to the documents 212 can direct a user to access the original data source 214 to retrieve the recommended documents 216. For example, the recommended documents 216 can be stored outside the server 208, being publicly available to any user.

FIG. 2 is a block diagram that illustrates an example data flow 200' for a recommendation of private content. The data flow 200' includes private documents 218, a tokenizer and tagger 220, a client topic classifier 222, server 208, model parameters 224, index of recommended documents 210, a filtering component 204, user preferences 202, and recommended documents 216.

The data flow 200' includes classification and filtering processes performed at the client system. For example, the data flow 200' can start with a user request of recommendation for a portion of private documents 218. Each of the private documents can be converted in structured documents, using a tokenizer and tagger 220, as described with reference to FIG.

1. The client topic classifier 222 receives the structured documents and retrieves a set of model parameters 224 from the server 208.

The client topic classifier 222 processes the structured documents using the set of model parameters 224 and generates an index of recommended documents 210. The index of recommended documents 210, based on the model parameters 224 may be provided to the filtering component 204, which uses the user preferences to determine the recommended documents 216. The filtering component 204 can use a filtering algorithm, as described with reference to FIG. 1.

Figure 3:
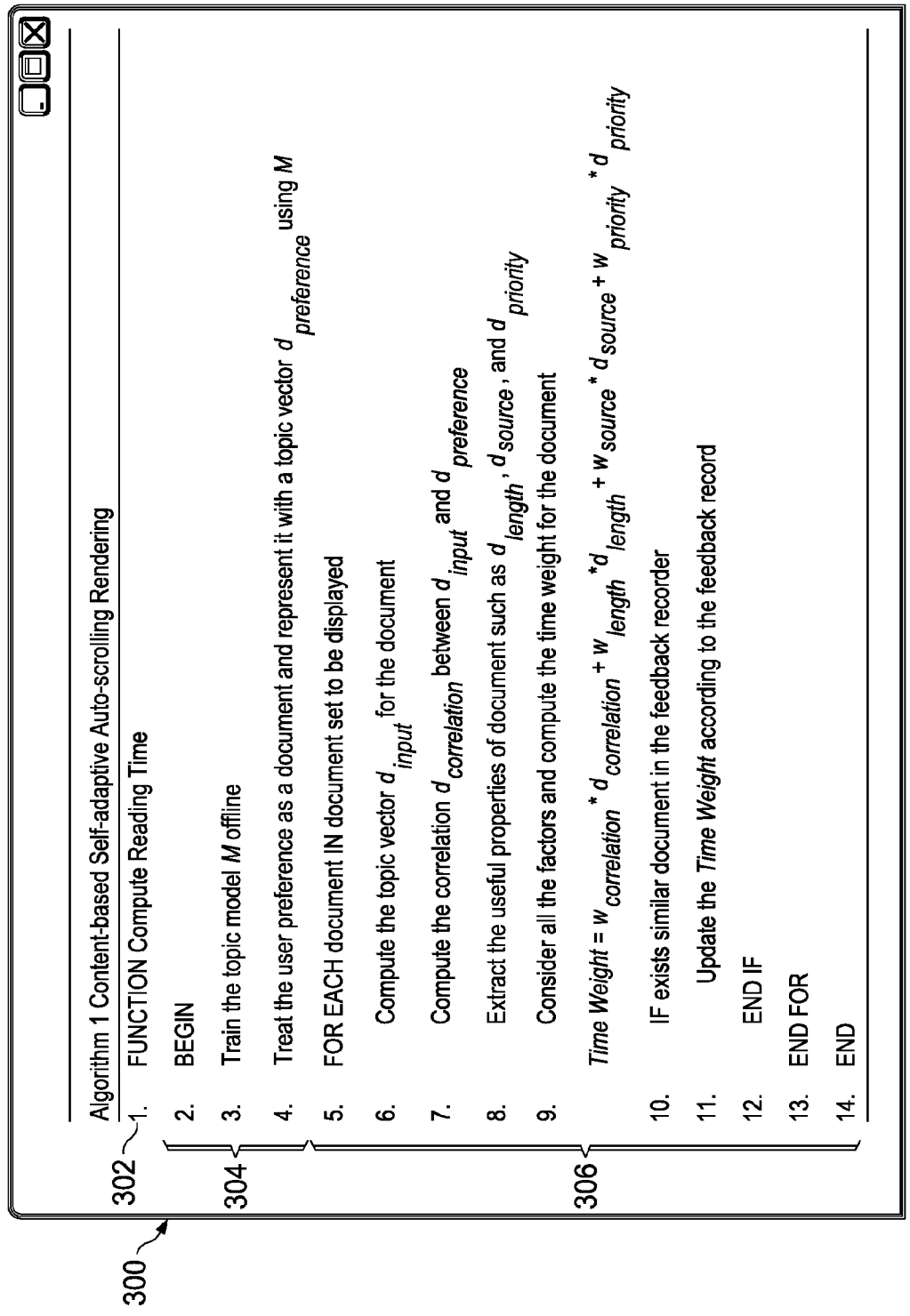
FIG. 3 is a chart that illustrates an example fuzzy query based on a user setting.

FIG. 3 is a chart that illustrates an example fuzzy query 300 based on a user setting. Within the illustrated example, the user's original request 302 includes the name "Steve Nash". For private documents recommendations, the original request 302 forms an accurate query, which may be used to determine the portion of recommended documents. For public documents recommendations, the original request 302 may be converted to a fuzzy query, with settings, which can vary between a soft and a strict level. For example, using a soft setting, the example user's original request 302 including the name "Steve Nash" can be converted to a first level fuzzy query 306 including the string "LA Lakers". The first level fuzzy query 306 can return a set of recommended documents that match the original request 302 and one or more queries 304 similar to the original request 302. Within the example context, a query 304 similar to the original request 302 can include the string "Kobe Bryant".

Using a medium setting, the example user's original request 302 including the name "Steve Nash" can be converted to a medium level fuzzy query 314 including the string "basketball." The medium level fuzzy query 314 can return a larger set of recommended documents include a match to the original request 302 and a plurality of categories in which the original request 302 can be included. For example, the original request 302 including the name "Steve Nash" can be converted to a fuzzy query "LA Lakers" 306. The fuzzy query "LA Lakers" 306 can be included in a fuzzier query "NBA" 310, which also includes a query "Heat" 308. The medium level fuzzy query 314 including the string "basketball" can include the fuzzy query "NBA" 310 and also other fuzzy queries, such as fuzzy query "NCAA" 312.

Using a strict setting, the example user's original request 302 including the name "Steve Nash" can be converted to a strict level fuzzy query 326 including the string "news". The strict level fuzzy query 326 can return a general set of recommended documents include a match to the original request 302 and a large plurality of categories in which the original request 302 can be included. For example, the recommended documents can cover a "sports" query 320, a "finance" query 322 and a "travel" query 324. The number of recommended documents from each category returned by the public server can be relatively equally distributed, which increases the processing time for preparing a recommendation of a portion of documents for the user.

Figure 4A:
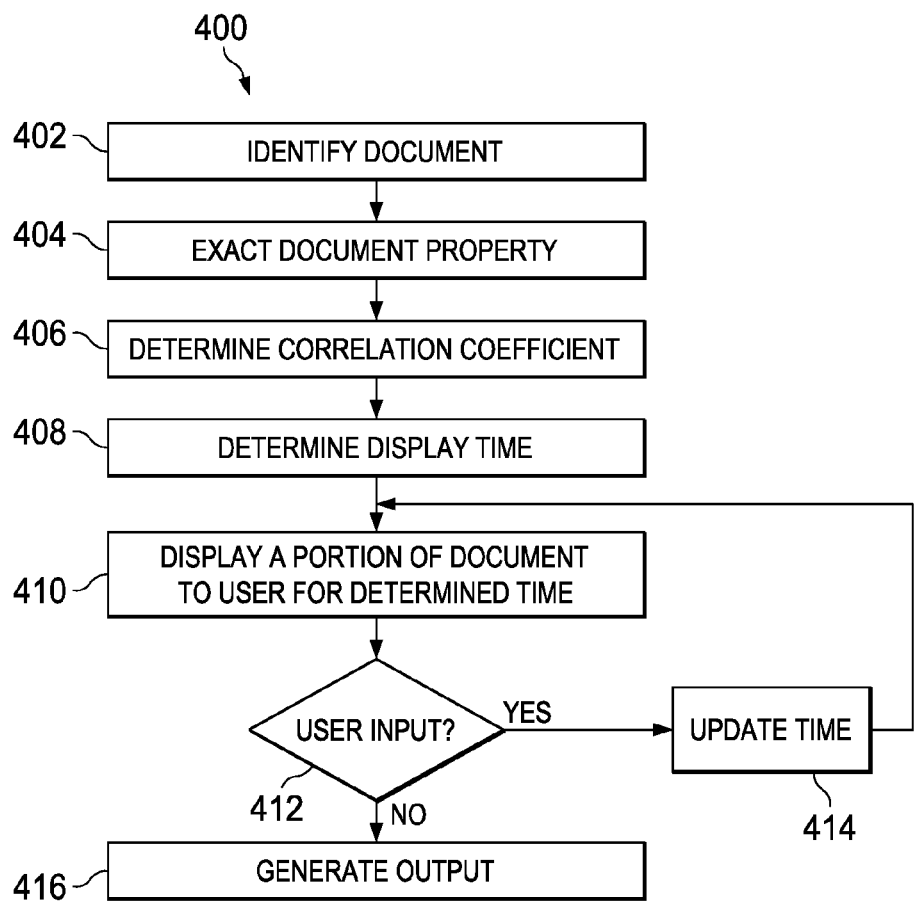
FIGS. 4A-4B are flow charts that illustrate a method for recommending content to a user.
Figure 4B:
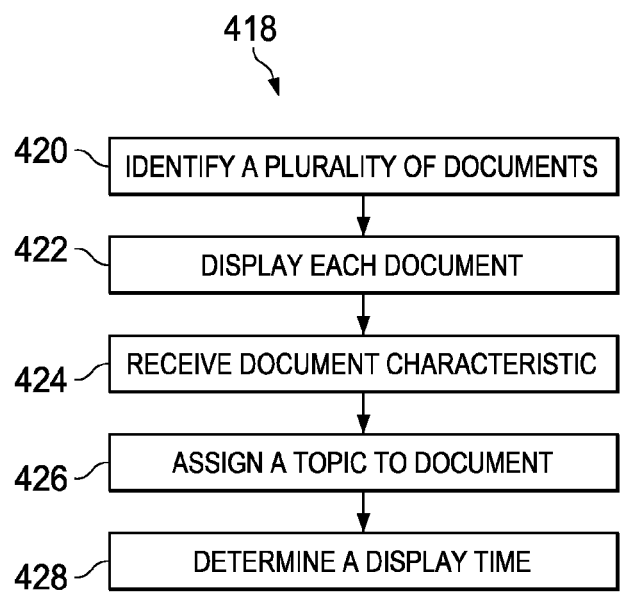

FIGS. 4A-4B are a flow chart that illustrates a method for recommending content to a user. A classified public content may be identified at step 402. The classified public content can be stored on a server appliance or a repository that may be communicably coupled to the server appliance. In some embodiments, the classified public content may be generated based on classifying the public content based on model parameters. The public content can include a plurality of electronic documents. The model parameters can be based on a topic model process performed on the plurality of electronic documents. A private content of a user is identified at step 404. The private content of a user can be stored on a client appliance or a repository that is communicably coupled to the client appliance. For example, the client appliance can be communicably coupled to the server appliance through a network.

A request for a recommendation of content can be received from the user at step 406. In some embodiments, the request for the recommendation of content can be parsed for one or more keywords. The parsed keywords can be used to determine one or more proxy keywords associated with particular user privacy settings. A representative query can be generated based on the request for a recommendation of content, at step 408. In some embodiments, the representative query may be generated based on the proxy keywords. A portion of the classified public content can be determined, based on the representative query, at step 410. In some embodiments, the client appliance receives an index that includes a list of the portion of the classified public content. The portion of the classified public content can be filtered based on one or more user settings.

A portion of the private content stored on the client appliance or the repository that is communicably coupled to the client appliance can be determined, based on the request at step 412. The portion of the classified public content and the portion of the private content can be prepared, for presentation to the user at step 414. The portion of the classified public content can be based on the representative query and the portion of the private content can be based on the request for the recommendation of content. In some embodiments, the classified public content presented to the user may be the list of the filtered portion of the classified public content. The list of the filtered portion of the classified public content can include one or more hyperlinks associated with the classified public content. In some embodiments, at least one of the client appliance, the server appliance, or the network includes a firewall that restricts unauthorized access between the client appliance and the server appliance.

In some implementations, steps 410 and 412 may be executed in parallel, such as at substantially the same time or near in time to each other, e.g., concurrently. For example, as described above, search for public content and private content may be performed in parallel and on separate appliances (e.g., search for public content on the server system 102 and search for private content on the client system 104). Recommended content from the results of such searches can then be presented together (or in some implementations, in separate indices or lists) to a user of the client system. In some implementations, the recommendations for public and private content may only share is a set of trained classifier parameters (e.g., model parameters 114).

Figure 5:
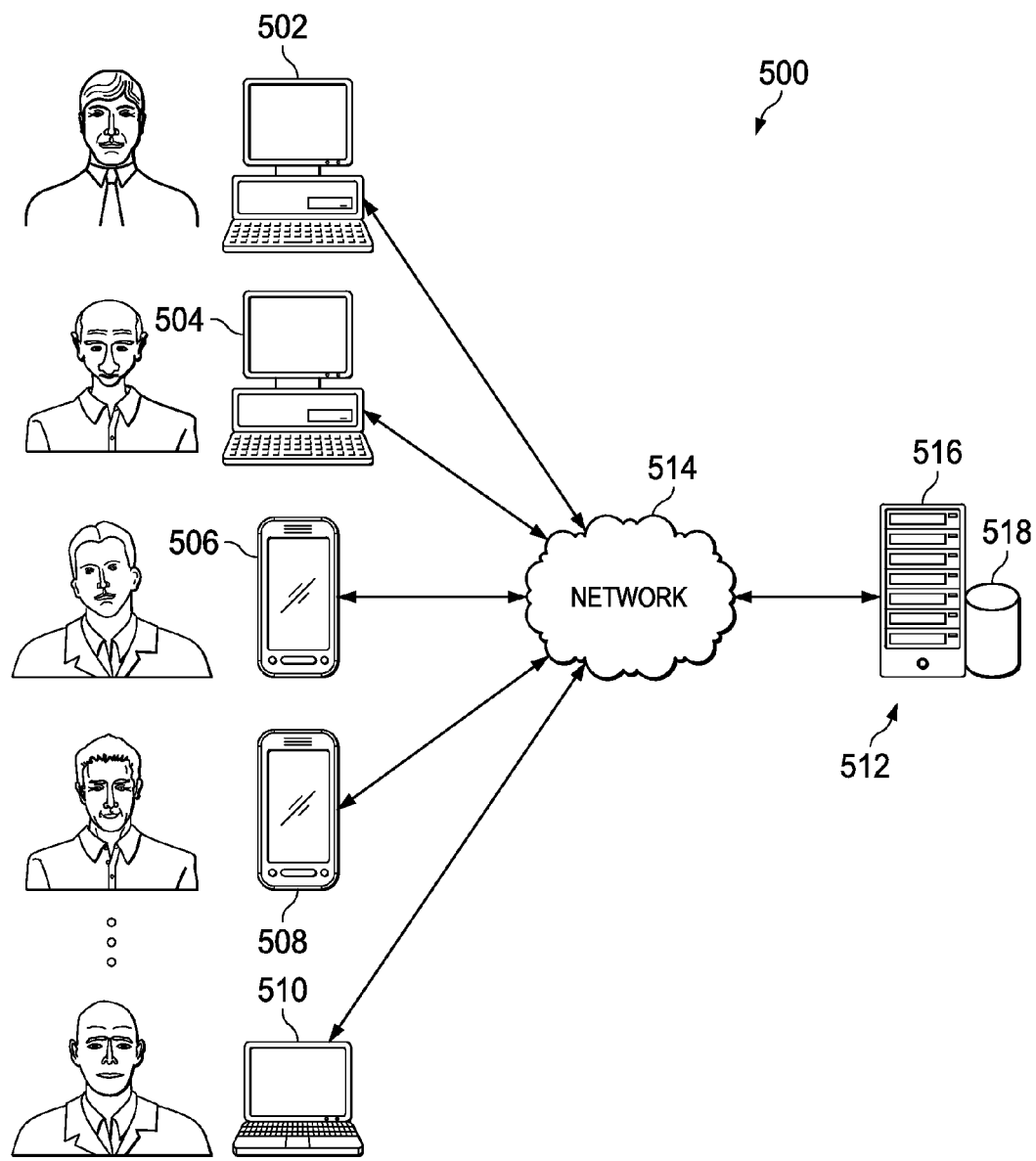
FIG. 5 is a diagram of an example system architecture for recommending content to a user.

FIG. 5 is a diagram of an example system architecture 500. The system architecture 500 includes a number of client devices 502, 504, 506, 508, 510 communicably connected to a server system 512 by a network 514. The server system 512 includes a processing device 516 and a data store 518. The processing device 516 executes computer instructions for recommending content from documents stored in the client devices 502, 504, 506, 508, 510 or the data store 518.

Users interacting with the client devices 502, 504, 506, 508, 510 can generate a request using a locally installed computer-implemented content recommender method, which can communicate with one or more service providers. The content recommender can classify and present portions of documents stored within the client devices 502, 504, 506, 508, 510 or documents retrieved over the network 514. Users interacting with the client device 502, 504, 506, 508, 510 can request recommendation of content of public documents, by selecting a particular level of privacy protection through a fuzzy query. A particular user can request recommendation of content by using different client devices 502, 504, 506, 508, 510 (e.g., from a smartphone while travelling and a laptop or desktop computer while being at home). In some implementations, the different client devices 502, 504, 506, 508, 510 can communicate with each other to maintain stored user preferences.

In some embodiments, the client devices 502, 504, 506, 508, 510 can be provided as computing devices such as laptop or desktop computers, smartphones, personal digital assistants, portable media players, tablet computers, or other appropriate computing devices that can be used to communicate with an electronic social network. In some embodiments, the server system 512 can be a single computing device such as a computer server. In some embodiments, the server system 512 can represent more than one computing device working together to perform the actions of a server computer (e.g., cloud computing). In some embodiments, the network 514 can be a public communication network (e.g., the world wide web, cellular data network, dialup modems over a telephone network) or a private communications network (e.g., private LAN, leased lines).

Implementations of the system architecture 500, as shown, can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, (e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that may be generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some embodiments, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single implementation. Conversely, various features that are described in the context of a single implementation can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4A-4B), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments, alterations, and permutations of the described embodiments are within the scope of the following claims as will be apparent to those skilled in the art. For example, the actions recited in the claims can be performed in a different order and still achieve desirable results.

Accordingly, the above description of example embodiments does not define or constrain this disclosure. Other changes, substitutions, and alterations are also possible without departing from the spirit and scope of this disclosure.

What is claimed is:

1. A computer-implemented method of recommending content to a user, comprising:
    identifying classified public content stored on a server appliance or a repository that is communicably coupled to the server appliance;
    identifying private content of a user stored on a client appliance or a repository that is communicably coupled to the client appliance, the client appliance communicably coupled to the server appliance through a network;
    receiving, from the user, i) a request for a recommendation of content and ii) a selection of a level of a hierarchical structure associated with the request for the recommendation of content;
    based on the selected level, determining one or more proxy keywords associated with one or more keywords of the request;
    generating a representative query based on i) the one or more proxy keywords and ii) the request for the recommendation of content;
    determining, based on the representative query, a portion of the classified public content stored on a server appliance or the repository that is communicably coupled to the server appliance;
    determining, based on the request, a portion of the private content stored on the client appliance or the repository that is communicably coupled to the client appliance; and
    preparing, for presentation to the user, the portion of the classified public content based on the representative query and the portion of the private content based on the request for the recommendation of content.

2. The computer-implemented method of claim 1, further comprising:
    receiving, at the client appliance, an index that comprises a list of the portion of the classified public content;
    filtering the portion of the classified public content based on one or more user settings; and
    preparing the list of the filtered portion of the classified public content for presentation to the user.

3. The computer-implemented method of claim 2, further comprising:
  presenting, to the user, the list of the filtered portion of the classified public content, the list comprising one or more hyperlinks associated with the classified public content; and
  presenting, to the user, the portion of the private content based on the request for the recommendation of content.

4. The computer-implemented method of claim 1, wherein at least one of the client appliance, the server appliance, or the network comprises a firewall that restricts unauthorized access between the client appliance and the server appliance.

5. The computer-implemented method of claim 1, further comprising:
  identifying public content communicably exposed to the server appliance, the public content comprising a plurality of electronic documents;
  generating a plurality of model parameters based on a topic model process performed on the plurality of electronic documents; and
  classifying the public content based on the model parameters to generate the classified public content.

6. The computer-implemented method of claim 1, wherein the public content comprises data publicly available through a world wide web, and the private content comprises at least one of an electronic mail associated with the user, a text or SMS message associated with the user, or a social networking message associated with the user.

7. A computer program product encoded on a non-transitory storage medium, the product comprising non-transitory, computer readable instructions for causing one or more processors to perform operations for recommending content to a user, the operations comprising:
  identifying classified public content stored on a server appliance or a repository that is communicably coupled to the server appliance;
  identifying private content of a user stored on a client appliance or a repository that is communicably coupled to the client appliance, the client appliance communicably coupled to the server appliance through a network;
  receiving, from the user, i) a request for a recommendation of content and ii) a selection of a level of a hierarchical structure associated with the request for the recommendation of content;
  based on the selected level, determining one or more proxy keywords associated with one or more keywords of the request;
  generating a representative query based on i) the one or more proxy keywords and ii) the request for the recommendation of content;
  determining, based on the representative query, a portion of the classified public content stored on a server appliance or the repository that is communicably coupled to the server appliance;
  determining, based on the request, a portion of the private content stored on the client appliance or the repository that is communicably coupled to the client appliance; and
  preparing, for presentation to the user, the portion of the classified public content based on the representative query and the portion of the private content based on the request for the recommendation of content.

8. The computer program product of claim 7, wherein the operations further comprise:
  receiving, at the client appliance, an index that comprises a list of the portion of the classified public content;
  filtering the portion of the classified public content based on one or more user settings; and
  preparing the list of the filtered portion of the classified public content for presentation to the user.

9. The computer program product of claim 8, wherein the operations further comprise:
  presenting, to the user, the list of the filtered portion of the classified public content, the list comprising one or more hyperlinks associated with the classified public content; and
  presenting, to the user, the portion of the private content based on the request for the recommendation of content.

10. The computer program product of claim 7, wherein at least one of the client appliance, the server appliance, or the network comprises a firewall that restricts unauthorized access between the client appliance and the server appliance.

11. The computer program product of claim 7, wherein the operations further comprise:
  identifying public content communicably exposed to the server appliance, the public content comprising a plurality of electronic documents;
  generating a plurality of model parameters based on a topic model process performed on the plurality of electronic documents; and
  classifying the public content based on the model parameters to generate the classified public content.

12. The computer program product of claim 7, wherein the public content comprises data publicly available through a world wide web, and the private content comprises at least one of an electronic mail associated with the user, a text or SMS message associated with the user, or a social networking message associated with the user.

13. A system of one or more computers configured to perform operations comprising:
  identifying classified public content stored on a server appliance or a repository that is communicably coupled to the server appliance;
  identifying private content of a user stored on a client appliance or a repository that is communicably coupled to the client appliance, the client appliance communicably coupled to the server appliance through a network;
  receiving, from the user, i) a request for a recommendation of content and ii) a selection of a level of a hierarchical structure associated with the request for the recommendation of content;
  based on the selected level, determining one or more proxy keywords associated with one or more keywords of the request;
  generating a representative query based on i) the one or more proxy keywords and ii) the request for the recommendation of content;
  determining, based on the representative query, a portion of the classified public content stored on a server appliance or the repository that is communicably coupled to the server appliance;
  determining, based on the request, a portion of the private content stored on the client appliance or the repository that is communicably coupled to the client appliance; and
  preparing, for presentation to the user, the portion of the classified public content based on the representative query and the portion of the private content based on the request for the recommendation of content.

14. The system of claim 13, wherein the operations further comprise:
  receiving, at the client appliance, an index that comprises a list of the portion of the classified public content;

filtering the portion of the classified public content based on one or more user settings; and preparing the list of the filtered portion of the classified public content for presentation to the user.

15. The system of claim 14, wherein the operations further comprise:

presenting, to the user, the list of the filtered portion of the classified public content, the list comprising one or more hyperlinks associated with the classified public content; and presenting, to the user, the portion of the private content based on the request for the recommendation of content.

16. The system of claim 13, wherein at least one of the client appliance, the server appliance, or the network comprises a firewall that restricts unauthorized access between the client appliance and the server appliance.

17. The system of claim 13, wherein the operations further comprise:

identifying public content communicably exposed to the server appliance, the public content comprising a plurality of electronic documents;

generating a plurality of model parameters based on a topic model process performed on the plurality of electronic documents; and classifying the public content based on the model parameters to generate the classified public content.

18. The system of claim 13, wherein the public content comprises data publicly available through a world wide web, and the private content comprises at least one of an electronic mail associated with the user, a text or SMS message associated with the user, or a social networking message associated with the user.

* * * * *